United States Patent [19]

Mees et al.

[11] Patent Number: 4,476,034

[45] Date of Patent: Oct. 9, 1984

[54] EMULSIFIERS FOR METAL PROCESSING OILS

[75] Inventors: Bernhard Mees, Eppstein; Horst Lorke, Liederbach, both of Fed. Rep. of Germany

[73] Assignee: Hoechst Aktiengesellschaft, Fed. Rep. of Germany

[21] Appl. No.: 390,338

[22] Filed: Jun. 21, 1982

[30] Foreign Application Priority Data

Jun. 27, 1981 [DE] Fed. Rep. of Germany ....... 3125297

[51] Int. Cl.$^3$ .................. B01F 17/00; B01F 17/26; B01F 17/42; C01M 1/06

[52] U.S. Cl. ................. 252/49.5; 252/355; 252/354

[58] Field of Search ................ 252/354, 355, 49.5

[56] References Cited

U.S. PATENT DOCUMENTS

| | | | |
|---|---|---|---|
| 3,322,790 | 5/1967 | Fritz et al. | 252/355 |
| 3,386,992 | 6/1968 | Schweiger | 252/354 |
| 3,926,839 | 12/1975 | McCoy et al. | 252/355 |
| 4,358,293 | 11/1982 | Mark | 252/351 |

FOREIGN PATENT DOCUMENTS 413457  7/1934  United Kingdom .

OTHER PUBLICATIONS

Kirk–Othmer, *Encyclopedia of chemical Technology,* 3rd edition, vol. 5, p. 786.

*Primary Examiner*—Richard D. Lovering
*Assistant Examiner*—Anne Brookes
*Attorney, Agent, or Firm*—Connolly & Hutz

[57] ABSTRACT

Oils for metal processing (e.g. oils for cutting operations) are typically aqueous emulsions, and the emulsifiers for these processing oils should have lubricating bacteriostatic/bactericidal, and corrosion-inhibiting properties. Suitable emulsifiers should comprise the following components:

(A) about 30 to 50, preferably 40 to 45, weight % of a chlorinated paraffin sulfonate in admixture with a partially chlorinated paraffin;

(B) about 15 to 30, preferably 20 to 25, weight % of at least one alkylsulfonamide/carboxylic or alkylsulfonamide/aminocarboxylic reaction product or a salt thereof;

(C) about 15 to 20, preferably 12 to 17, weight % of a surface-active compound of the formula

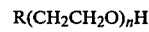

in which n is from 3 to 12, and R is $C_{10}$–$C_{22}$-alkanoyloxy or -alkenoyloxy, $C_8$–$C_{22}$-alkoxy or -alkenoxy, $C_6$–$C_{16}$-alkylphenyl or -alkylnaphthyl, or mono-, di- or tri-$C_8$–$C_{22}$-alkyl- or -alkenylamine; and (D) about 15 to 25 weight % of a mono- or di-ethanolamine $C_{12}$–$C_{20}$ aliphatic carboxylic acid reaction product.

3 Claims, No Drawings

EMULSIFIERS FOR METAL PROCESSING OILS

Emulsifiers for the manufacture of emulsifiable metal processing oils applied in the form of aqueous emulsions for cutting operations in metal processing are generally so-called natural or synthetic sodium petroleum sulfonates, that is, sodium salts of aromatic sulfonic acids. The disadvantages of these known compounds reside in the required large amounts of these emulsifiers, missing lubricating effect and susceptibility to bacteria and fungi.

The subject of the invention is an improved emulsifier which in addition to a pronounced emulsifying action in mineral oils and an effective protection against corrosion also has lubricating and bacteriostatic/bactericidal properties, and which substantially consists of (A) about 30 to 50, preferably 40 to 45, weight % of a chlorinated paraffin sulfonate in admixture with a partially chlorinated paraffin;

(B) about 15 to 30, preferably 20 to 25, weight % of reaction products obtained by converting sulfochlorides of alkylaromatic, cycloaliphatic, alkylcycloaliphatic or, preferably, aliphatic hydrocarbons having a total of 12 to 24 carbon atoms to the corresponding alkylsulfonamides with the use of ammonia or primary lower aliphatic amines and subsequently reacting these alkylsulfonamides with halocarboxylic acids having from 2 to 22 carbon atoms in the presence of alkalis, or by reacting the above sulfochlorides with aminocarboxylic acids having from 2 to 11 carbon atoms in the presence of alkalis; the reaction products optionally being converted subsequently to the sodium, potassium, mono-, di- or trialkanolamine salts, morpholine salts or cyclohexylamine salts;

(C) about 15 to 20, preferably 12 to 17, weight % of a surface-active compound of the formula $$R(CH_2CH_2O)_nH$$

in which n is an integer of from 3 to 12 and R is $C_{10}$-$C_{22}$-alkanoyloxy or -alkenoyloxy, $C_8$-$C_{22}$-alkoxy or -alkenoxy, $C_6$-$C_{16}$-alkylphenyl or -alkylnaphthyl, or mono-, di- or tri-$C_8$-$C_{22}$-alkyl- or -alkenylamine;

(D) about 15 to 25 weight % of a reaction product of mono- or diethanolamine with a saturated or unsaturated aliphatic carboxylic acid having from 12 to 20 carbon atoms.

The emulsifying action of the above mixture is essentially due to the effect of component A, while the other components have a rather anticorrosive effect.

Component A is substantially a mixture of chloroparaffin and secondary chloralkane sulfonate having a chain length of 12 to 17 carbon atoms each, preferably in a ratio of 55:45 and a chlorination degree of from 1.25 to 5 mols of chlorine per mol of the mixture. These products are obtained by chlorination of the mixture of secondary alkanesulfonate and unreacted paraffin formed in the sulfoxidation of paraffins.

Compound B is substantially a compound of the formula

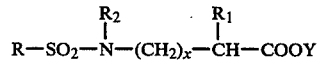

in which R is an alkylaromatic, cycloaliphatic, alkylcycloaliphatic or, preferably, aliphatic radical having from 12 to 24 carbon atoms, $R_1$ is hydrogen or $CH_3$, $R_2$ is hydrogen or an alkyl or oxyalkyl radical having up to 3 carbon atoms, or the radical

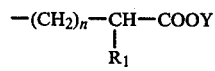

x is an integer of from 0 to 9, and Y is hydrogen or an equivalent of an alkali metal cation, alkanolamine cation or morpholine cation. These reaction products can be prepared according to the process of German Pat. No. 767,071, starting from the sulfochlorination products of aliphatic hydrocarbons. Suitable alkylsulfochlorides are dodecylbenzene sulfochloride, octylbenzene sulfochloride, isopropylnaphthalene sulfochloride or nonylnaphthalene sulfochloride.

Suitable substances for component C are those nonionic surface-active compounds which contain from 3 to 12 ethylene oxide moieties and one hydrophobic hydrocarbon radical per molecule, for example the addition compounds of about 6 to 10, especially 8 or 9, mols of ethylene oxide to 1 mol of a saturated or unsaturated fatty acid having about 10 to 12 carbon atoms, especially an unsaturated fatty acid having 16 to 18 carbon atoms; the addition products of about 4 to 10, preferably 5 or 6, mols of ethylene oxide to 1 mol of a saturated or unsaturated fatty alcohol having about 8 to 20 carbon atoms, especially an unsaturated fatty acid having from 16 to 18 carbon atoms; the addition products of about 4 to 12, preferably 6 to 8, mols of ethylene oxide to 1 mol of an alkylphenol or alkylnaphthol; the alkyl radicals containing about 6 to 16, preferably 8 to 12, carbon atoms and being linear or branched; or the reaction products of about 3 to 10, preferably 5 to 7, mols of ethylene oxide with 1 mol of a primary, secondary or tertiary, saturated or unsaturated alkylamine having from 8 to 22, preferably 14 to 18, carbon atoms in the alkyl radical. The amount of component C in the concentrate is preferably 15 weight %.

Component D of the emulsifiers of the invention is a mixture consisting substantially of about 40 to 70, preferably 50 to 60, weight % of a compound of the formula

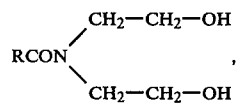

an amount of about 10 to 50, preferably 20 to 40, weight % of a compound of the formula

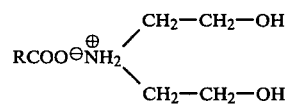

and an amount of about 10 to 20 weight % of a compound of the formula

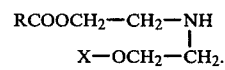

In these formulae, R is alkyl or alkenyl having from 12 to 20 carbon atoms, and X is hydrogen or —OCR. Component D is contained in the emulsifier according to the invention in an amount of preferably 20 weight %.

Component D is obtained by reaction of 1 mol of a saturated or unsaturated fatty acid having from 12 to 20, preferably 16 to 18, carbon atoms, and about 1 to 3, preferably 2, mols of mono- or diethanolamine. The reaction is carried out as follows: the two components are mixed and heated for about 3 to 6 hours at about 100° to 160° C., preferably 120° to 150° C.

The emulsifier of the invention consisting of components A through D may contain in addition a certain amount of further auxiliaries and additives for defoaming and stabilizing the emulsion, for example silicone oil emulsions and petroleum. The addition of fatty acids which in turn form defoaming calcium soaps has often proved to be advantageous. Fatty acids, that is, the salts formed therefrom, furthermore increase the spontaneity of emulsification and the stability of the emulsion itself. The products may also be blended directly with the emulsifier, that is, the mixture of components A through D.

For application, the emulsifiers are added to mixed basic or paraffin basic mineral oils in an amount of from 15 to 60, preferably 20 to 50, weight %. These so-called metal processing oils are diluted with water in a ratio of from 1:20 to 1:100, preferably 1:30. The emulsions serve for cooling, lubricating and corrosion proofing in cutting processes of non-ferrous metals (heavy and light metals), for example cutting, drilling, milling, lathe turning, grinding etc.

The advantageously high lubricating effect of the chloroalkanesulfonates and chloroparaffins (component A described above) as compared to natural or synthetic petroleum sulfonates is proved by the following results. For determining the lubricating effect, 10 to 20% aqueous solutions of these products were prepared and the specific surface pressure in bar was measured on the fretting balance according to Reichert:

Product I: natural petroleum sulfonate Na mols 430

Product II: synthetic petroleum sulfonate Na mols 430

Product III: paraffin $C_{12}$–$C_{17}$-sulfonate

Product IV: paraffin $C_{12}$–$C_{17}$-sulfonate containing 2.5 mols Cl

Product V: paraffin $C_{12}$–$C_{17}$-sulfonate containing 5 mols Cl.

| Product No. | 10% aqueous solution | 20% aqueous solution |
| --- | --- | --- |
| I | 135 bar | 170 bar |
| II | 120 bar | 160 bar |
| III | 200 bar | 300 bar |
| IV | 270 bar | 250 bar |
| V | 320 bar | 400 bar |

The advantageously high stability of the emulsions according to the invention to bacteria and fungi which is important for their service life is illustrated by the following comparison with emulsions prepared with the use of petroleum sulfonates as emulsifiers:

Metal processing oil A (comparative product)

80 weight % of mineral oil consisting of
50 to 70% of paraffins
25 to 30% of naphthenes
0 to 25% of aromatic substances
Viscosity: 3° to 5° E/20° C.
20 weight % of emulsifier consisting of
35% of synthetic or natural petroleum sulfonate Na salt (about 62% active substance) molecular weight 420
15% of sodium/triethanolammonium salt of an alkyl-sulfonamidoacetic acid
15% nonylphenol+6 mols of ethylene oxide
15% of tallow oil fatty acid-diethanolamide
15% of oleic acid, ind. grade
5% of potassium hydroxide solution (50% strength)

Metal processing oil B (according to invention)

80% of mineral oil consisting of
50 to 70% of paraffins
25 to 30% of naphthenes
0 to 25% of aromatic substances
20 weight % of emulsifier consisting of
35% of sodium salt of chloro-$C_{12}$–$C_{17}$-paraffin sulfonate and chloro-$C_{12}$–$C_{17}$-paraffin (about 45% of active substance), chlorine content 2.5 mols
15% of sodium/triethanolammonium salt of a $C_{13}$–$C_{18}$-alkylsulfonamido-acetic acid
15% of nonylphenol+6 mols of ethylene oxide
15% of a reaction product of tallow oil fatty acid and diethanolamine
15% of oleic acid, ind. grade
5% of potassium hydroxide solution (50% strength)

From the above-mentioned metal processing oils 3% emulsions were prepared which after a 24 hours' standing at 20° C. showed no alterations whatsoever. This is valid, too, for metal processing oil B the emulsifier of which contains a small amount of component A. These 3% emulsions were subjected to the attack of microorganisms, and the number of germs per ml of emulsion was counted at the beginning and after 1, 7, 14, 21 and 28 days.

| Metal processing Oil | Number of germs after | drilling oil strain (*) | *Escherichia coli* | *Candida albicans* |
| --- | --- | --- | --- | --- |
| A | start | $10^6$ | $10^6$ | $10^5$ |
|  | 1 day | $10^6$ | $10^6$ | $10^5$ |
|  | 7 days | $10^6$ | $10^6$ | $10^5$ |
|  | 14 days | $10^6$ | $10^6$ | $10^5$ |
|  | 21 days | $10^5$ | $10^4$ | $10^5$ |
|  | 28 days | $10^5$ | $10^4$ | $10^5$ |
| B | start | $10^5$ | $10^5$ | $10^5$ |
|  | 1 day | $10^5$ | $10^4$ | $10^5$ |
|  | 7 days | $10^4$ | $10^4$ | $10^4$ |
|  | 14 days | $10^4$ | $10^3$ | $10^3$ |
|  | 21 days | $10^4$ | $10^2$ | $10^3$ |
|  | 28 days | $10^3$ | $10^2$ | $10^3$ |

(*) gram-negative strain of bacteria, similar to *pseudomonas aeroginosa*.

As to biological degradability, sodium petroleum sulfonates are reputed to be unsatisfactory, and chlorinated paraffin sulfonates to be well degradable (according to the Zahn-Wellens test).

EXAMPLES FOR THE PREPARATION OF COMPONENT A

EXAMPLE 1

1,400 Parts by weight of a bleached concentrate obtained by sulfoxidation of a paraffin having a chain length of $C_{12}$ to $C_{17}$ and composed as follows:
38.2% sec. alkanesulfonic acid
1.6% sulfuric acid 53.3% paraffin ($C_{12}$–$C_{17}$)
6.9% water are introduced into a chlorination vessel, and chlorinated while stirring and under UV catalysis at 80° C. with 1,600 parts by weight of gaseous chlorine; the HCl gas formed being driven off via a condenser. Subsequently, the chlorinated product is introduced into a heatable separating funnel, and the sulfuric acid still present is removed by stirring with 300 parts by weight of concentrated hydrochloric acid. Thereafter, excess hydrochloric acid is distilled off from the reaction product under reduced pressure, and the batch is neutralized with 140 parts by weight of 50% sodium hydroxide solution to pH 3–4. The remaining water is removed in vacuo at 60°–70° C. until a residual water content of below 1% is attained. The final pH of about 7.5–8 is adjusted by adding about 30 parts by weight of triethanolamine, and 2,150 parts by weight of the emulsifier in the form of a brown liquid still pourable is obtained; chlorination degree about 2.5 mols of chlorine per mol of alkanesulfonic acid.

EXAMPLE 2

1,400 Parts by weight of a bleached concentrate according to Example 1 are chlorinated with 800 parts by weight of chlorine according to the conditions described in Example 1. After separation of excess sulfuric acid with aqueous hydrochloric acid and subsequent distillation of HCl, the batch is neutralized with 145 parts by weight of 50% sodium hydroxide solution. Remaining water is distilled off until a content of below 1% is attained. 1,725 Parts by weight of a light brown pasty emulsifier is obtained which corresponds to the emulsifier of Example 1 with respect to emulsifying and corrosion proofing properties. Chlorination degree about 1.25 mols of chlorine per mol of alkanesulfonic acid.

EXAMPLE 3

2,330 Parts by weight of a four component system obtained in the sulfoxidation of a paraffin having a chain length of $C_{12}$ to $C_{17}$ and composed as follows:
32% paraffin ($C_{12}$–$C_{17}$)
38% water
22% sec. alkanesulfonic acid
8% sulfuric acid are chlorinated in a chlorination vessel with stirring and UV catalysis at 100° C. with 1,600 parts by weight of gaseous chlorine; the HCl formed being driven off via a condenser. After the reaction is complete, the batch is cooled to 80° C., and the aqueous phases are let off as lower phase. Remaining hydrochloric acid still present in the upper phase is removed by flushing with nitrogen. Subsequently, the batch is neutralized at 50° C. with 145 parts by weight of sodium hydroxide solution, and excess water is removed in vacuo. 2.100 parts by weight of a pourable, light brown emulsifier having a chlorination degree of 2.5 mols are obtained.

EXAMPLE 4

2,330 Parts by weight of the four component system of Example 3 are chlorinated as described in Example 3 with 3,200 parts by weight of gaseous chlorine. After separation of the aqueous lower phase and after having driven off HCl gas, the upper phase is neutralized at 50° C. with 150 parts by weight of 50% sodium hydroxide solution, and excess water is removed in vacuo. 2,100 parts by weight of a dark brown, well pourable emulsifier having a chlorination degree of 5 mols of chlorine are obtained.

Further emulsifiers according to the invention are listed as follows. They are obtained in all cases by simply mixing all components.

A

55% of sodium salt of chloro-$C_{12}$–$C_{17}$-paraffin sulfonate and chloro-$C_{12}$–$C_{17}$-paraffin (chlorine content 1.5 mols)

15% of sodium/triethanolammonium salt of a $C_{13}$–$C_{18}$-alkylsulfonamidoacetic acid 15% of oleylamine + 5 mols of ethylene oxide 20% of a reaction product of tallow oil fatty acid and diethanolamine

B

50% of sodium salt of chloro-$C_{12}$–$C_{17}$-paraffin sulfonate and chloro-$C_{12}$–$C_{17}$-paraffin (chlorine content 1.5 mols)

20% of sodium/triethanolammonium salt of a $C_{13}$–$C_{18}$-alkylsulfonamidoacetic acid 10% of oleic acid + 7 mols of ethylene oxide 20% of a reaction product of soybean oil fatty acid and diethanolamine

C

40% of sodium salt of chloro-$C_{12}$–$C_{17}$-paraffin sulfonate and chloro-$C_{12}$–$C_{17}$-paraffin (chlorine content 2.5 mols)

25% of sodium/triethanolammonium salt of a $C_{13}$–$C_{18}$-alkylsulfonamidoacetic acid 15% of nonylphenol + 6 mols of ethylene oxide 20% of a reaction product of sunflower oil fatty acid and diethanolamine

D

40% of sodium salt of chloro-$C_{12}$–$C_{17}$-paraffin sulfonate and chloro-$C_{12}$–$C_{17}$-paraffin (chlorine content 1.5 mols)

25% of sodium/triethanolammonium salt of a $C_{13}$–$C_{18}$-alkylsulfonamidoacetic acid 15% of oleic acid and 7 mols of ethylene oxide 20% of a reaction product of tallow oil fatty acid and diethanolamine

E

30% of sodium salt of chloro-$C_{12}$–$C_{17}$-paraffin sulfonate and chloro-$C_{12}$–$C_{17}$-paraffin (chlorine content 5 mols)

30% of sodium/triethanolammonium salt of a $C_{13}$–$C_{18}$-alkylsulfonamidoacetic acid 20% of nonylphenol + 6 mols of ethylene oxide 20% of a reaction product of tallow oil fatty acid and diethanolamine

F

30% of sodium salt of chloro-$C_{12}$–$C_{17}$-paraffin sulfonate and chloro-$C_{12}$–$C_{17}$-paraffin (chlorine content 5 mols)

30% of sodium/triethanolammonium salt of a $C_{13}$–$C_{18}$-alkylsulfonamidoacetic acid 20% of oleylamine + 5 mols of ethylene oxide 20% of a reaction product of soybean oil fatty acid and diethanolamine

What is claimed is:

1. An emulsifier for an emulsifiable metal process oil which consists essentially of:
(A) about 30 to 50 weight % of a mixture of chloroparaffin and secondary chloralkane sulfonate having a chain length of 12 to 17 carbon atoms each in a ratio of 55:45 and a chlorination degree of from 1.25 to 5 mols of chlorine per mol of the mixture, (B) about 15 to 30 weight % of a compound of the formula

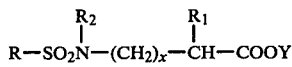

in which R is an alkylaromatic, cycloaliphatic, alkylcycloaliphatic or aliphatic group having from 12 to 24 carbon atoms, $R_1$ is hydrogen or $CH_3$, $R_2$ is hydrogen or an alkyl or oxyalkyl group having up to 3 carbon atoms, or the group

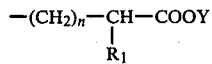

x is an integer of from 0 to 9, and Y is hydrogen or an equivalent of an alkali metal cation, alkanolamine cation or morpholine cation, (C) about 12 to 20 weight % of a surface-active compound of the formula $R(CH_2CH_2O)_nH$ in which n is an integer of from 3 to 12 and R is $C_{10}$–$C_{22}$-alkanoyloxy or -alkenoyloxy, $C_8$–$C_{22}$-alkoxy or -alkenoxy, $C_6$–$C_{16}$-alkylphenyl or -alkylnaphthyl, or mono-, di- or tri-$C_8$–$C_{22}$-alkyl- or -alkenylamine;

(D) about 15 to 25 weight % of a mixture consisting substantially of about 40 to 70 weight % of a compound of the formula

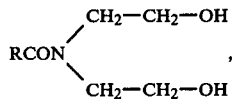

an amount of about 10 to 50 weight % of a compound of the formula

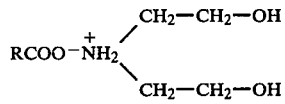

and an amount of about 10 to 20 weight % of a compound of the formula

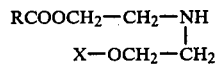

in which formulae R is alkyl or alkenyl having from 12 to 20 carbon atoms, and X is hydrogen or —OCR.

2. An emulsifier as claimed in claim 1, which consists essentially of from 40 to 45 weight % of said component A, 20 to 25 weight % of said component B, 12 to 17 weight % of component C and 20 weight % of component D.

3. A metal processing oil comprising a mixture containing the emulsifier of claim 3 and mixed basic or paraffin basic mineral oils, said mixture having been diluted with water in a ratio of from 1:20 to 1:100, the amount of said emulsifier in said mixture, prior to dilution with water, being 15 to 60% by weight.

* * * * *